(No Model.)
T. M. GRILLEY.
FOLDING KNIFE AND FORK.
No. 288,174. Patented Nov. 6, 1883.
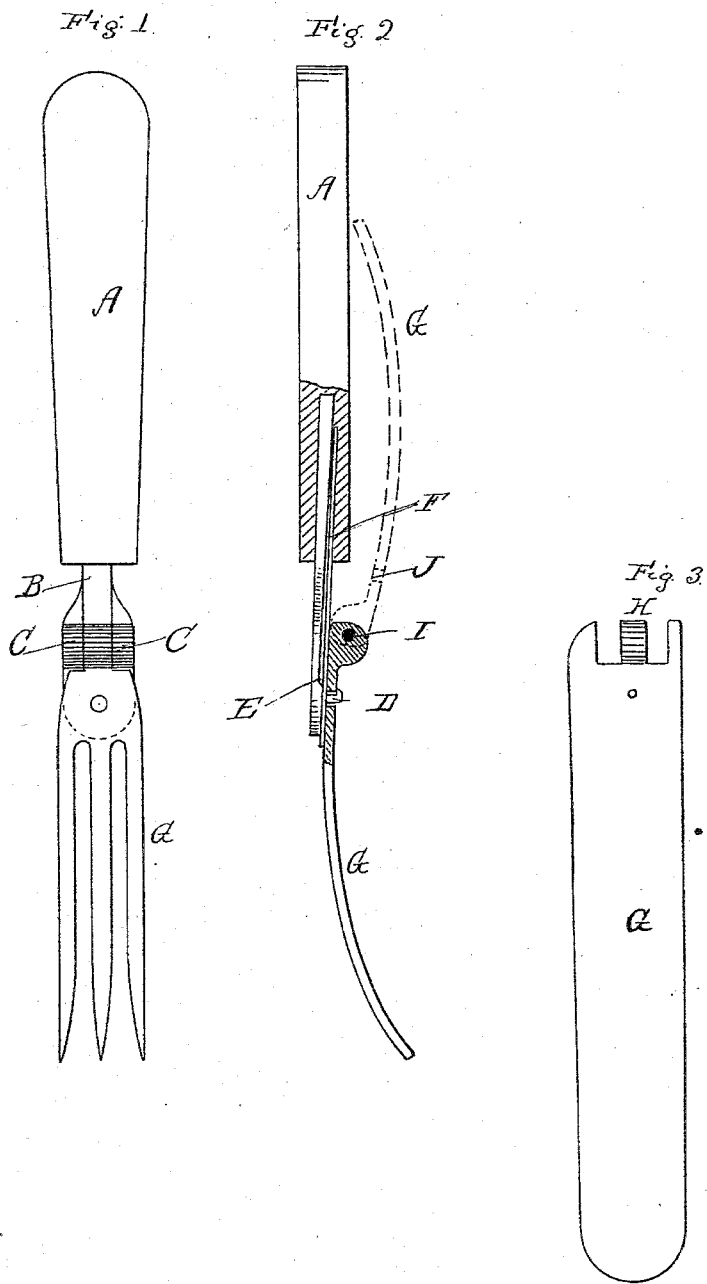

UNITED STATES PATENT OFFICE.

THOMAS M. GRILLEY, OF WEST HAVEN, CONNECTICUT, ASSIGNOR OF ONE-HALF TO GEORGE W. BOCEMSDES, OF SAME PLACE.

FOLDING KNIFE AND FORK.

SPECIFICATION forming part of Letters Patent No. 288,174, dated November 6, 1883.

Application filed June 21, 1883. (No model.)

*To all whom it may concern:*

Be it known that I, THOMAS M. GRILLEY, a citizen of the United States, residing at West Haven, in the county of New Haven and State of Connecticut, have invented certain new and useful Improvements in Folding Knives and Forks, of which the following is a specification, reference being had therein to the accompanying drawings.

This invention consists in certain improvements, as hereinafter described and claimed, in that class of table-cutlery wherein the blade of a knife or the tines of a fork or bowl of a spoon have hinge-connection with and are adapted to fold down upon the handle.

In the drawings, Figure 1 represents a front elevation of a fork constructed according to my improvements. Fig. 2 represents a side elevation thereof, partly in section, the full lines showing the tines in position for use and the dotted lines showing the tines folded down upon the handle. Fig. 3 shows a knife-blade constructed according to my improvements.

A represents a handle, which may be of any desired material. Within the upper end is formed the customary recess for receiving the shank of the knife or fork. Within this recess I secure by any suitable means a shank or prong, B, having outwardly-projecting lugs C C, while at a point in advance thereof is a pin or stud, D, also projecting therefrom in the same direction as do the lugs C.

E represents a notch or stop intermediate of the lugs C and pin or stud D, which is formed in said shank or prong B either by slightly increasing the thickness of said shank at its extreme front end or by recessing said shank for a part of its length, or otherwise.

F represents a plate-spring, which at its outer end is clamped to the enlarged front end of the prong or shank B, and from thence its free end passes inward either in the manner shown in the drawings to and within the recess in the handle A, within which it has freedom of movement transversely; or the free end of said spring may, if desired, extend simply just rearward of the lugs C.

G represents the tines of a fork, the shank or butt of which is either recessed or cut away, so as to leave thereon a central cam-shaped lug, H; or such lug may be formed thereon without cutting away any part of the butt.

I represents a hole, which is bored through the lugs C C and the lug H, and through which a rivet or pin is passed for the purpose of pivotally connecting the tines and prong or shank B.

J represents a slot or hole formed in the base or butt of the fork, which, when the fork is turned into operative position, will engage with the pin or stud D, as shown in Fig. 2. This pin or stud is rearwardly hook-shaped, or has a head or horizontal projection, *a*, formed thereon. When the fork-tines or other operative member, G, are extended, the free end of the plate-spring F will press against one face thereof and force the same against the headed projection of the pin D, thereby securely clamping such member in position. Similarly, when the member G is folded over in the manner indicated by dotted lines, the free end of said spring will press against the lug H at the rear or butt of the tines, and by its friction upward thereon hold said member securely in folded position until it is desired to use the same, when by an upward pull upon the forward end the tension of the spring will be overcome, and the tines or other member can then be readily turned over and extended.

The knife-blade shown in Fig. 3 is similarly constructed at its base as are the fork-tines, and can be attached to and folded down upon a handle, and be held securely in either position thereon in the same manner as above described. Similarly the shank of the bowl of a spoon can be formed with a lug, as H, and a slot or hole, as J, and be connected to a shank or handle, A, and be folded down upon or extended therefrom in the same manner as described with reference to fork-tines.

Having thus described my invention, what I claim therein is—

1. A knife, fork, or spoon having its operative member pivotally connected to and adapted to fold down upon the side face of the handle, and provided with a slot or hole in the butt or base thereof, in combination with a shank or prong having a pin or stud provided with a rearwardly-projecting head, and a plate-spring adapted, when the operative member is extended, to press the same in locking contact with the headed pin, and when said operative member is folded down to hold the same in closed position, substantially as set forth.

2. A knife, fork, or spoon having handle A, provided with the customary central recess, shank or prong B, having near its front end outwardly-projecting lugs C C, a pin or stud, D, in advance of said lugs, and having rearwardly-projecting head or lug a, and a notch or stop, E, intermediate of said lugs C and pin D, a blade or other operative member, G, having central cam-shaped lug, H, and slot J, said lugs C and H having a central hole, I, and being pivotally connected together to adapt the operative member to fold over rearwardly upon the handle, and a plate-spring, F, attached at its front end to the notch or stop E, its free end operating to press against the cam-lug H, and thereby hold the operative member G rigidly in both its extended and folded positions, substantially as set forth.

In testimony whereof I affix my signature in presence of two witnesses.

THOMAS M. GRILLEY.

Witnesses:
CHAS. A. OAKS,
GEORGE H. BEECHER.